April 7, 1964  J. R. McCONNELL  3,127,661
FABRICATING OF STRUCTURAL STEEL MEMBERS OR UNITS
Filed Nov. 13, 1959  5 Sheets-Sheet 1

INVENTOR.
John R. McConnell
BY

April 7, 1964   J. R. McCONNELL   3,127,661
FABRICATING OF STRUCTURAL STEEL MEMBERS OR UNITS
Filed Nov. 13, 1959   5 Sheets-Sheet 2
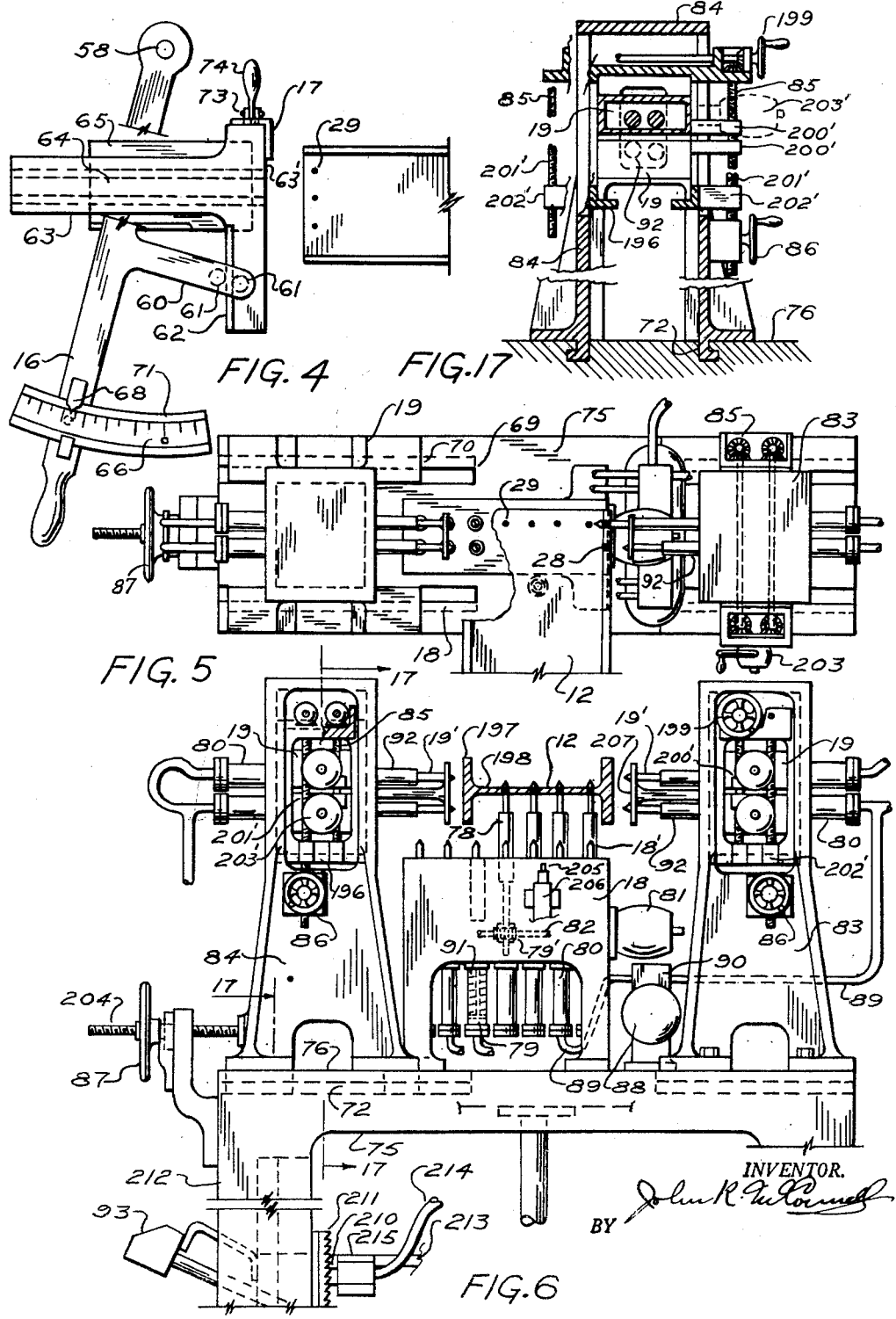

April 7, 1964  J. R. McCONNELL  3,127,661
FABRICATING OF STRUCTURAL STEEL MEMBERS OR UNITS
Filed Nov. 13, 1959  5 Sheets-Sheet 3
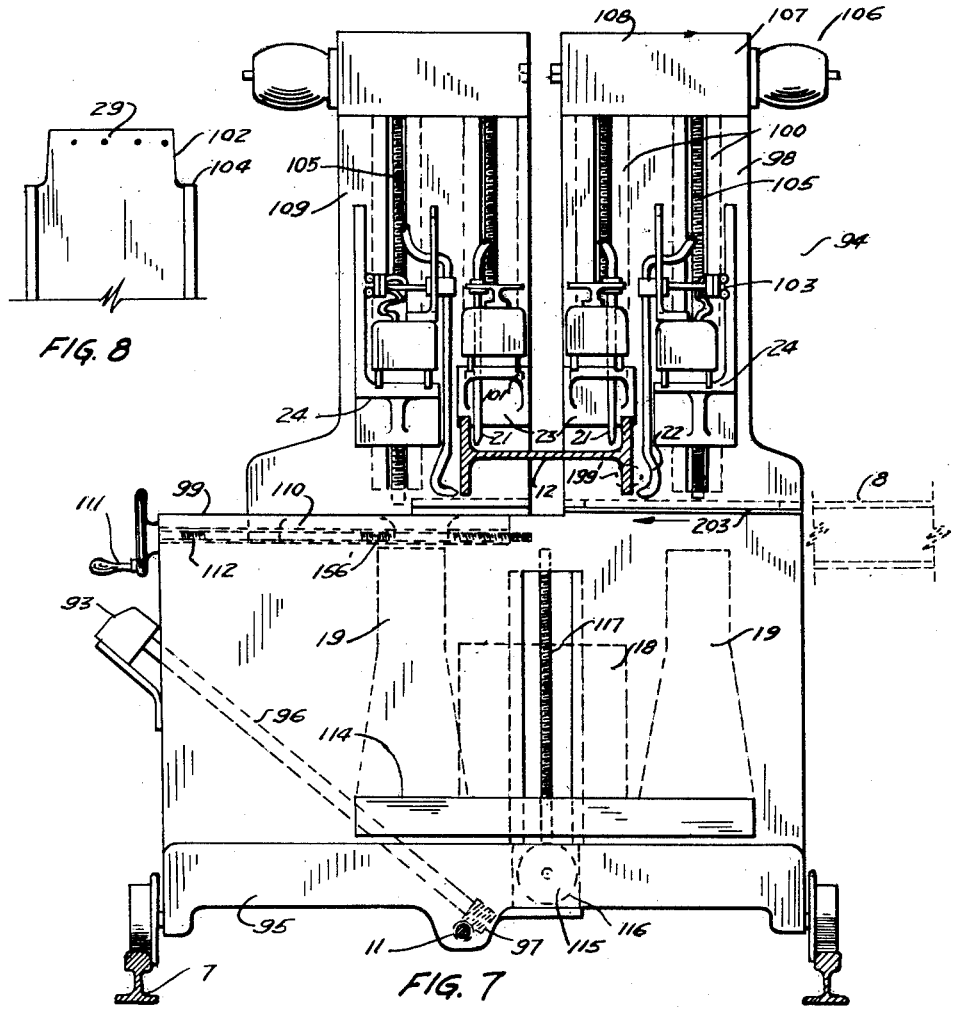
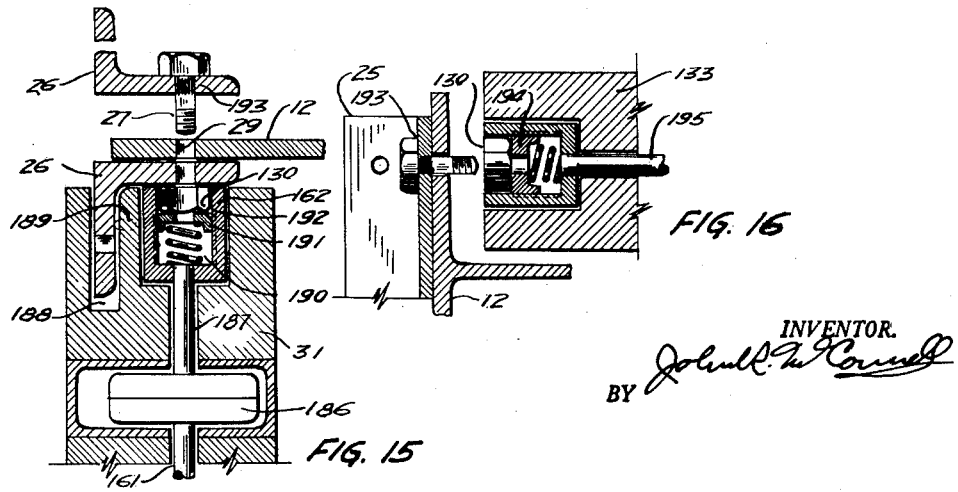
INVENTOR.
John R. McConnell
BY April 7, 1964  J. R. McCONNELL  3,127,661
FABRICATING OF STRUCTURAL STEEL MEMBERS OR UNITS
Filed Nov. 13, 1959  5 Sheets-Sheet 4

INVENTOR.
BY John R. McConnell

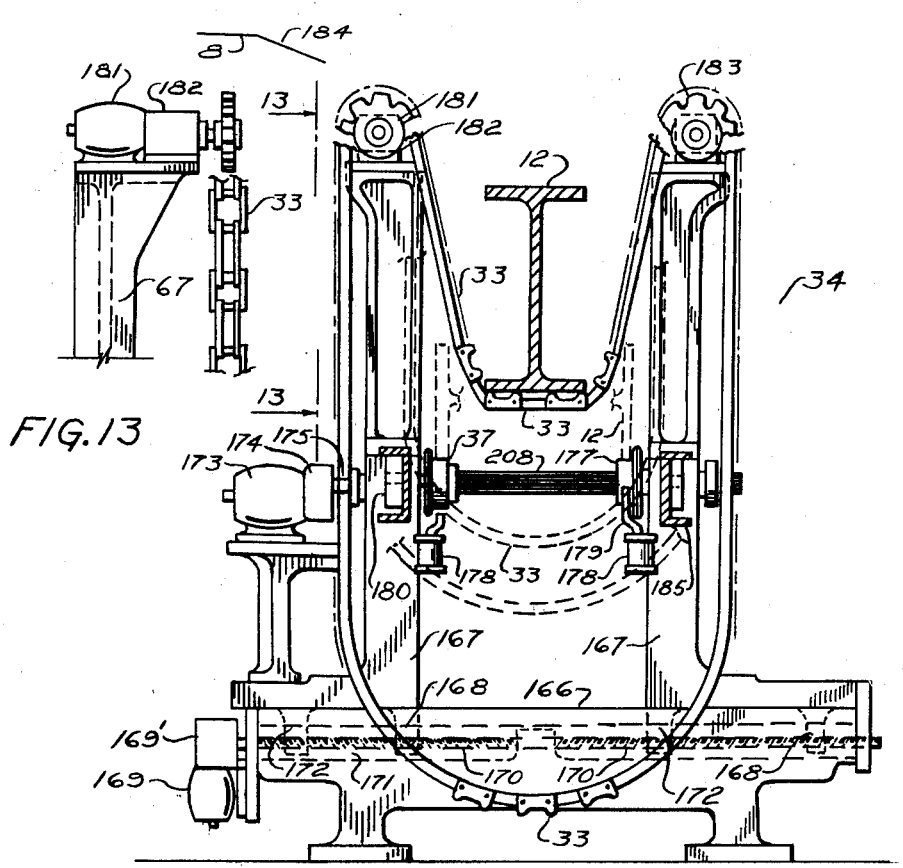
FIG. 13
FIG. 11
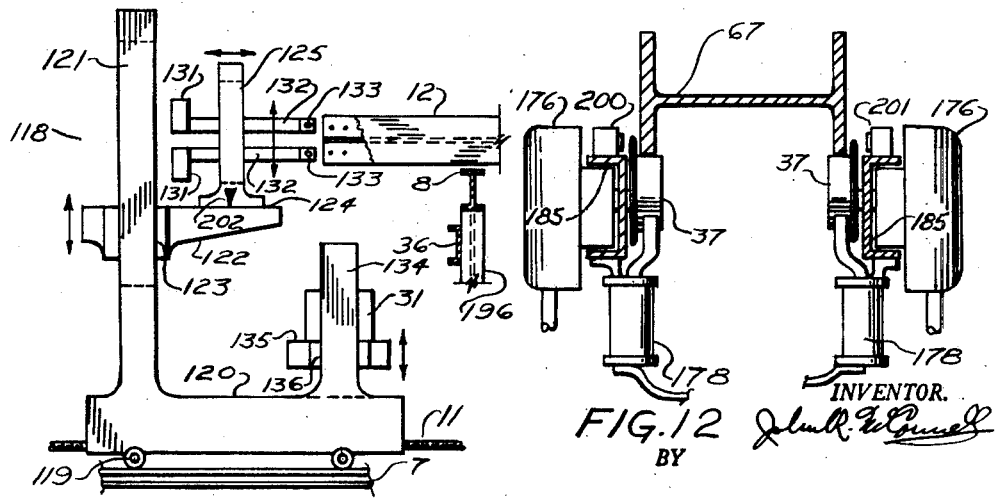
FIG. 14
FIG. 12

United States Patent Office 3,127,661
Patented Apr. 7, 1964

3,127,661
FABRICATING OF STRUCTURAL STEEL
MEMBERS OR UNITS
John R. McConnell, 148 Woodside Ave.,
Ridgewood, N.J.
Filed Nov. 13, 1959, Ser. No. 852,892
3 Claims. (Cl. 29—33)

This invention relates to machine tools and, more particularly, to a machine for the drilling of holes through steel shapes, coping said shapes, and bolting partly pre-assembled details to the shape.

It is an object of the present invention to provide apparatus for simultaneously drilling holes through all faces of structural steel shapes, with substantial accuracy, greater ease, and at an increased rate of speed.

Another object of the present invention is to provide apparatus for automatically coping, blocking, and cutting ends of shapes for fitting of same to supports and to other shapes.

A further object of the present invention is to provide apparatus for substantially automatic bolting and nut running, to a controlled, pre-determined torque value, with the use of partly pre-assembled details and high strength precision, contact friction, self-locking bolts therewithin.

Still another object of the present invention is to provide steel shape handling apparatus of the type shown in FIGURES 8 and 16 of my Patent No. 3,085,148 for handling such structural shapes during fabricating operations.

An additional object of the present invention is to provide a versatile and flexible fabricating machine, readily adjusted for quickly and economically fabricating various types of members, with or without duplicating operations and of varying sizes and lengths, without time consuming interruptions between each step thereof.

A further object of the present invention is to facilitate the handling, loading, and conveying of the material through the machine and its operations, to length centre the shapes, to precisely automatically measure for and locate the details and operations, and to provide for rapid inspection and discharge of the completely fabricated member, with a minimum of manual labor and handling, using a minimum amount of apparatus, with consequently less cost, maintenance, and complications.

For other objects and for a better understanding of the invention, reference may be had to the following detailed description taken in conjunction with the accompanying drawing in which:

FIGURE 4 is a detail plan view of length centering lever at ends of drilling station of FIGURE 1;

FIGURE 5 is a top plan view of the three way end drilling unit of FIGURE 1;

FIGURE 6 is a side elevation of the three way end drilling unit taken on line 6—6 of FIGURE 1;

FIGURE 7 is a side elevation of the end, automatic, coping unit of FIGURE 1 taken on line 7—7 forming another part of the present invention;

FIGURE 8 is a side view at the end of a shape, showing top and bottom flanges, with parts of the web and flanges, coped for fitting by the unit of FIGURE 7;

FIGURE 11 is a side elevation of the chain rotating unit used for inspection of completed members, taken along line 11—11 of FIGURE 1, forming still another part of the present invention;

FIGURE 12 is a transverse cross-sectional view of transmission channels and rotating propulsion wheels for carrying assembled shapes out of the integrated machine, this view being taken along line 12—12 of FIGURE 1;

FIGURE 13 is a fragmentary side detail view of gear and chain drive on line 13—13 of FIGURE 11;

FIGURE 14 is a diagrammatic end view of the automatic nut-running unit of FIGURES 9 and 10, showing the relation of parts and their movements and actions;

FIGURE 15 is a detail cross-section of angle retaining block and nut running socket of FIGURES 9 and 10, the view being taken along line 15—15 of FIGURE 10;

FIGURE 16 is a detail cross-section of the nut-running device for bolting the angles to the flanges of the shape;

FIGURE 17 is a vertical cross-section of flange drilling heads taken along line 17—17 of FIGURE 6.

In the paragraphs below a general overall explanation of the mechanized process is given that will require reference to the succeeding detail figures.

Figure 1:
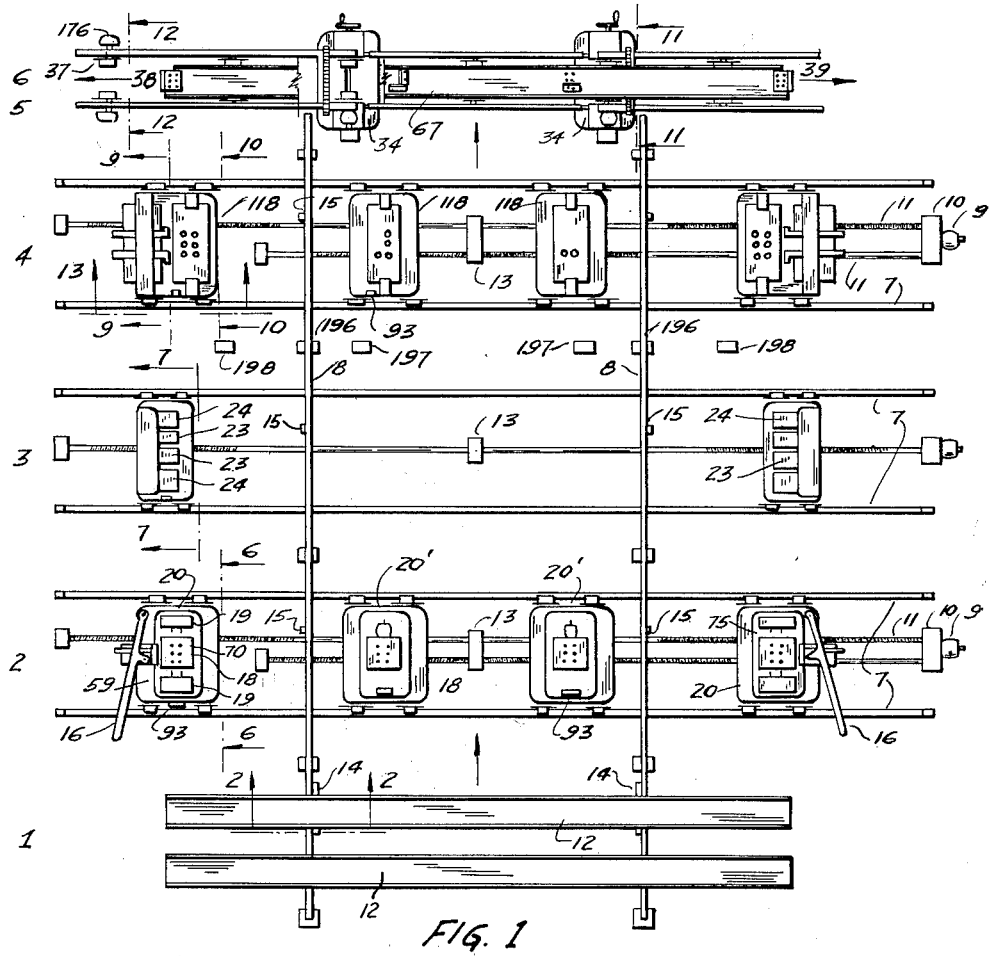
FIGURE 1 is a plan view of the overall, integrated machine in accordance with the present invention.

The structural steel fabricating machine, as shown in the overall layout plan of FIGURE 1, is an integrated, co-acting apparatus consisting of a plurality of co-operating, complementary fabricating units, designed to turn out completely fabricated beams and girders of all depths and lengths. It is capable of performing a variety of operations upon and of applying details to the raw shapes, whereby making it a flexible and versatile apparatus. Many of the operations are inter-dependent and must fit precisely to each other, and all are a series of necessary steps in the completely finished fabrication of unit members ready for assembly and erection on the construction site.

The primary objectives of this device are to save time in the delivery of the pre-fabricated units by the elimination of repeated handlings, trucking and storing between operations, individual manual measuring, human errors, mistakes, and poor judgment, machine and crane delays, bad scheduling of separate plural machines and operations, to secure machine accuracy, to eliminate heavy manual lifting and moving, to increase the productiveness of labor, and to improve the product and decrease the cost.

Referring now more in detail to the drawings and more particularly to FIGURE 1 thereof, a shape loading station is shown at 1, a length centering and drilling station at 2, an end coping-blocking-cutting station at 3, a bolting-nut-running station at 4, and an inspection station at 5 with shape discharge at 6.

At each of the stations 2, 3 and 4, a plurality of inter-connected fabricating units are adjustably mounted, in line, on parallel longitudinal tracks 7, with transversely extending, dual, material transmission rails 8 extending across and above the tracks 7 of all stations, with said transmission rails supported on plural pairs of posts anchored to floor.

A detail drawing accompanies each run of girders or shapes that are to be fabricated. In agreement with the dimensions given on this drawing, the outside and inside fabricating units at each of the stations 2, 3 and 4 are moved symmetrically in pairs by motor 9, speed reducer 10, and right and left threaded shaft 11, to perform their operations at the stated precise locations on a shape 12, measured from the mid-point anchorages 13, of the layout. The detail element or angles are brought to the fabricating units and all fixtures, jigs, dies, tools and heads of units are properly adjusted for the particular work each is to perform.

Shapes 12 are placed on dual material transmission rails 8 at loading station 1 by overhead crane or other means. Individually, the shape 12 are loaded on pairs of buggies of dollys 14 and are rolled manually till stopped on centre at the drilling station 2 by stops 15. Operators standing at the opposite end of the station manually converge length centering the levers 16 against shape at each end thereof, moving each equal distances. Shape is then locked to both dollys 14 in a manner to be later described and hold downs 17 of FIG. 4 are secured to each end of the beam or shape 12. Vertical and horizontal pneumatic-mechanical drill heads 18 and 19 on drilling units 20 are then raised, converged, and actuated, cutting through three faces of the shape 12 for later bolting. On completion, the drilling heads are retracted and dollys 14 with locked shape are forwarded to following or coping station 3.

On arrival over centre of coping station 3, multiple, automatically guided, cutting torches 21 and 22 of FIG. 7 on vertically movable, horizontal platens 23 and 24 are lowered to shape 12, actuated, and remove the necessary parts of the shape to fit the shape to its support. On retraction of the cutting torches, shape 12 is progressed to the bolting station 4.

Figure 9:
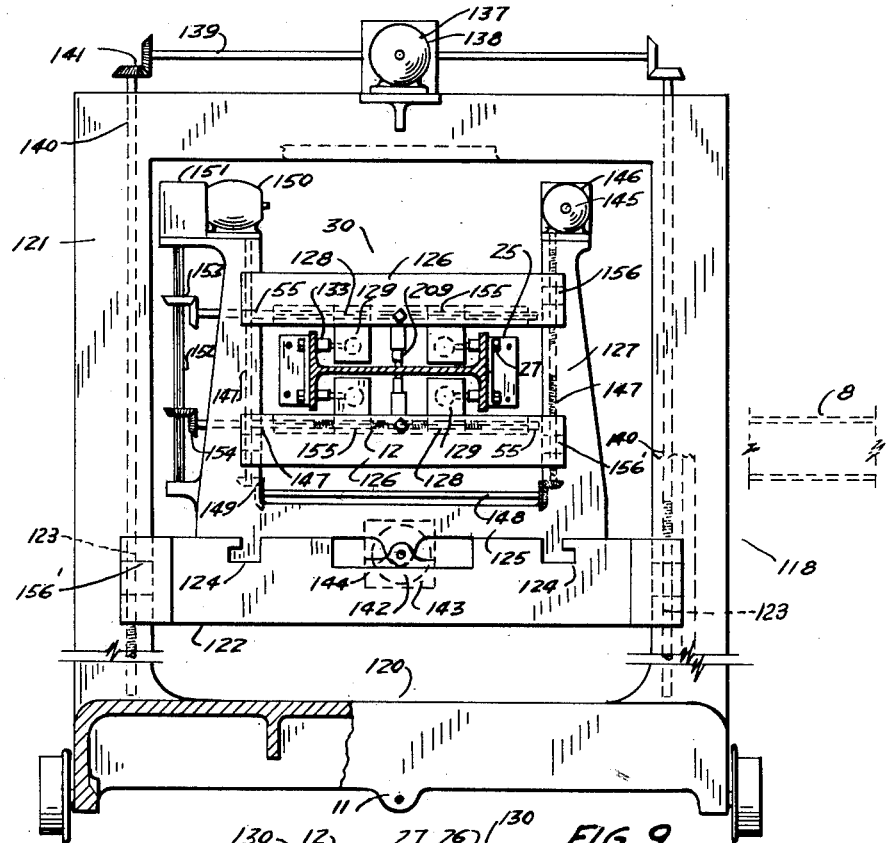
FIGURE 9 is a transverse cross-sectional view of flange bolting, automatic nut-running unit taken on line 9—9 of FIGURE 1.
Figure 10:
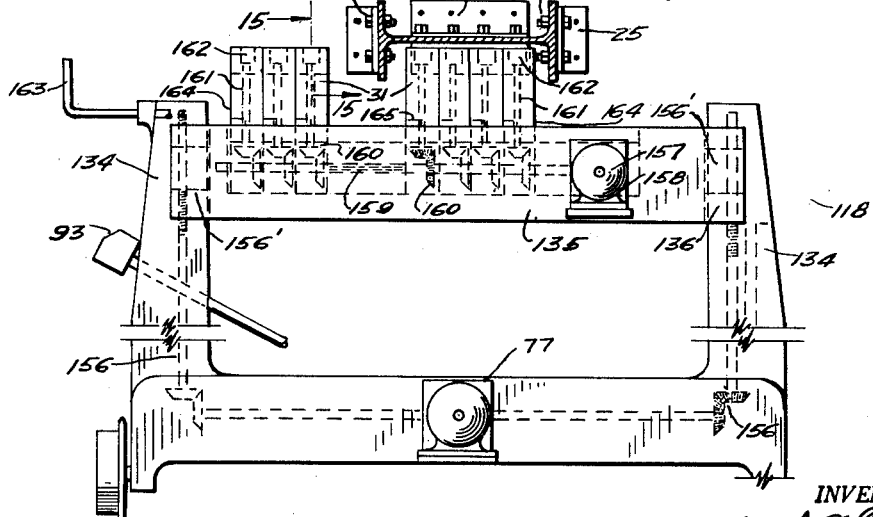
FIGURE 10 is a side elevation of the web bolting of the automatic nut-running unit taken on line 10—10 of FIGURE 1.

On arrival over centre of bolting-nut running station 4, angles 25 and 26 of FIGS. 10, 15 and 16 or other details, with precision bolts 27 force-fitted through precisely drilled holes 28 and 29 of FIG. 5 in contact leg of detail, are manually placed in position on the shape and nut-running heads 30 and 31 of FIGS. 9 and 10 are forwarded against same, actuated, and turn nut onto bolt shank 27 of FIG. 15 to a specified tension or torque resistance. Flange angles 25 are fixed first and then the web details 26 of FIGS. 9, 10, 15 and 16. On completion, the assembled shape is progressed to the inspection station 5 and discharged from the machine at 6.

Figures 2, 3:
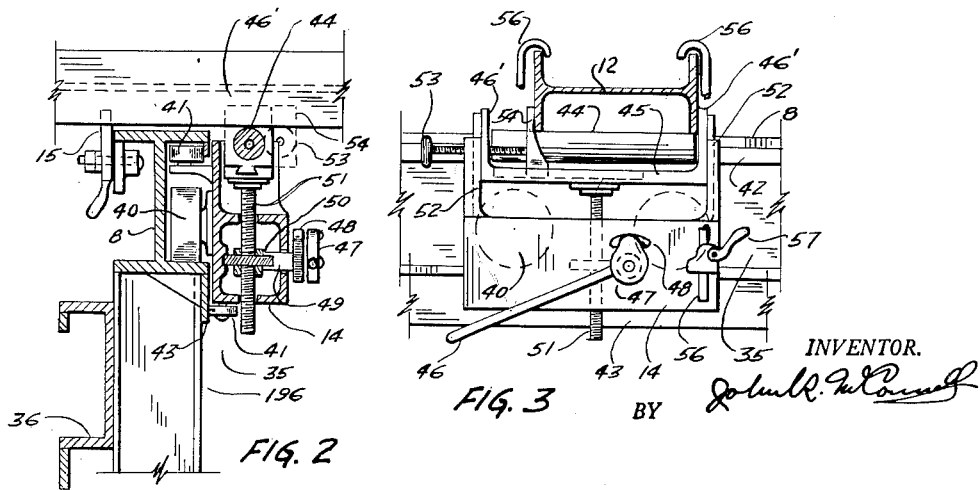
FIGURE 2 is a transverse cross-sectional view of the conveying buggy or dolly taken along line 2—2 of FIGURE 1.
FIGURE 3 is a side elevation of buggy of FIGURE 2.

On arrival at end of transmission rails 8, locks 56 of FIG. 3 to dollys 14 are released and the assembled shape is dumped onto slightly sagged trough of endless chain 33 of rotating unit 34 of FIG. 11. Shape is lowered into the sag of the chain and slowly rotated for inspection of all work on all faces of the shape. Dollys 14 are removed from operating side 35 of FIG. 2 of transmission rails and returned on sloping channel 36 on opposite side thereof. On completion of inspection, the shape is lowered with web horizontal to rotative propulsion rolls 37 of FIGS. 1 and 11, same are actuated, and shape is discharged longitudinally to left at 38 for shipping or further processing, or to the right at 39 for manual repair or rejection.

In FIGURES 2 and 3 there is shown a detailed transverse section of the elevating, conveying dolly 14, eccentrically mounted on one side 35 of the trough of the transmission rail 8, supported by two wheels 40 on the flange with four wheels 41 bearing against upper and lower vertical plates 42 and 43. With roller 44 and carrying table 45 lowered, the dolly 14 is rolled under shape 12 at loading station 1. Raising lever 46 working through ratchet 47' and pawl 48, shaft 49 and a train of gears 50 and threaded, table raising screw 51, elevates the carrying table 45 in grooves 52 of the dolly 14, FIG. 3. Vertical tabs or ears 46' of table 45 carry the freely revolving roller 44 journalled in same. Handwheel 53 of rear, dovetailed, clamping follower 54 presses same lightly against rear flange of shape 12 until shape is lightly gripped against forward tab 46' of table 45. On continued raising, with shape 12 clear of transmission rails 8, the shape 12 on dual dollies 14 is manually forwarded till arrested by stops 15 over centre of length centering-drilling station 2. When shape is length centered by equally converged end levers 16 of FIG. 1, clamp 54 is tightened, and hooked, hold-down rods 56 are placed over the shape flanges and locked down tight by cam levers 57. Dual transmission rails 8 are exactly parallel to each other and extend normal to multiple operating tracks 7 of fabricating units. Mid length anchorages and transverse measuring axis 13 for power operated, right and left hand screws 11 for symmetrical spacing of fabricating units about same are located on a straight line between stations and centerel between transmission rails 8 and parallel thereto. With the above conditions prevailing, the shape 12 is carried to each station in precise dimensional relation to properly locate the fabricating units for progressive, complementary operations that may often require close tolerance matching or fitting by successive transverse fabricating units.

FIGURE 4 illustrates the details of length centering lever 16 at station 2 of FIGURE 1. This hand lever 16 is pivoted at 58 on upright standard at rear of base casting 59, FIG. 1 and carries a laterally-extending protruding arm 60, fitted with slightly spaced rollers 61 bearing against opposite faces of an upward leg 62 of T shaped ram 63 with an engaging face 63' that operates longitudinally in a T groove 64 of a horizontal table 65, supported on an upright on base 59. Near the hand operating end of the lever 16 a radial scale 66 is similarly mounted. In operation, the shape 12 comes into station 2 usually not length centered on the mid-length anchorage 13 that is used for all control measurements. For practically all beams and girders, details and operations should be symmetrical and measured from the centre of the length of the shape 12. As the shapes for a plurality of the same assembled member 67 very randomly in length as much as one and one half inches, the necessity is always present of length centering each shape for balanced details and the avoidance of holes 29 being placed too close to either end of the shape.

When the shape is stopped on longitudinal center line of FIG. 1 by adjustable stop 15, both levers are converged manually, by the operators so that the shape is moved longitudinally till pointers 68 on both scales 66 or signal show the same overhang beyond the operating centres of the outermost drills 18' in the drilling heads 18. With contact face 63' of ram 63 in contact with end of shape, the length of shape beyond the outermost drills is shown on scale in inches and fractions; the zero 71 of scale coinciding with centre of end holes 29. The hand lever 16 is then slightly depressed with underside pin locking in a rack or series of holes in supporting standard. The vertically-operating hold down angle 17 is dropped onto forward flange of the beam and locked by a cam 73 on a hand lever 74. A linkage would bring this to within easy reach of operator.

FIGURES 5 and 6 show plan and side elevation views of drilling heads 18 and 19 for a double row of vertical and horizontal multiple drills 18" and 19' for the American Institute of Steel Construction standardized side connection angles 26 and flange connection angles 25 of FIGS. 15 and 16. The drilling heads are mounted on a piston raised table 75, as set forth in my co-pending application Serial No. 833,872 or may be raised to operating level 76, FIG. 6, after the shape 12 is moved transversely into position, by means of the elevating mechanism 77 shown in FIGURE 10.

The drill head 18 carries multiple spindles 78 that are individually vertically projected against web of shape to be drilled. Pistons 79, attached to lower ends of spindles 78, carry the drills 18' to the work face, operating in compressed air cylinders 80 against a return action spring 91, FIG. 6. Electric or air motor 81 drives common drive shaft 82, with all individual, keyed spindles 78 geared at 79' to same. The depth of shape and type of connection to be made determines the number of drills used.

Fixed upright and transversely adjustable, open end, stirrup shaped frames 83 and 84 carry drills 19' horizontally projected in pairs by similar means hereinbefore described. Vertical distance between drills is adjustable by screw 85, FIG. 17, while vertical height above transmission rail 8 is adjustable by wheel 86. Handwheel 87 adjust location of frame 84 T keyed at 72 to table 75 to suit (horizontal) depth of shape 12. Combined compressed air tank and manifold 88 feeds air to individual, piston control lines 89 by means of a plurality of electrically-controlled valves 90. Said valves also exhaust cylinder air, with opposed spring 91 operating in cylinder 80 against piston, returning drill in spindle 78 from work face. Direct numerical reading interconnected drum dials 93, direct connected to unit spacing power shaft 11 of FIG. 1, show length between paired units using doubled dimensions from mid-length anchorage 13. On completion of drilling, spindles 78 and 92 are retracted and table 75 lowered to non-operating level to permit the progression of shape.

Inside drilling unit 20', for web drilling only, is a modification of the end drilling unit 20, eliminating the length centering and flange drilling mechanism, FIG. 1.

In FIGURE 7, there is shown the end a coping unit 94 of station 3, FIGURE 1 consisting of a base 95 on rotative wheels movable on station track 7 by powered right and left threaded shaft 11. Dials 93 are connected to said screw 11 through shaft 96 and gearing 97 indicates location of said unit from mid-length anchorage 13. A vertical back wall 98 extends upwardly from one side of a horizontal table 99. This back wall is T slotted at 100 for dual, vertically operating, horizontal, table brackets 23 and 24. On the left bracket 23, a commercially available guided gas cutting torch 21 is mounted, with cutting tube operating through hole 101 in table to cut or cope with web of the beam as shown at 102 in FIGURE 8. On the right bracket 24, a similar gas cutting torch 22 with different fixtures 103 is mounted to cut across the flange of shape in a vertical direction shown at 104 of FIG. 8. Both cuts are made simultaneously, with cuts lapping and resulting in a piece at the end of the shape falling off. There are available a variety of different types, drives, controls and methods of guiding well known to those skilled in the art and will not, therefore be described in detail. They can be arranged for any shape of cut in both planes of the shape. Tables are raised or lowered independently by threaded drive shafts 105, clutches, and controls driven by one motor 106, speed reducer 107 and a train of gears and shafts enclosed in a head housing 108.

A similar mechanism as above described is mounted on a laterally adjustable back stop 109 on main table 99 at the left of the coping unit 94 and viewed in FIG. 7 for similar operations on the opposite flange of the shape 12. This back stop 109 is T keyed 110 to table 99 and is shifted laterally to adjust for depth of the shape by hand wheel 111 and threaded shaft 112. This coping unit 94 has drill heads 18 and 19 associated with and are carried on a cable 114 that can be raised and lowered by a motor 115, speed reducer 116 and adjusting shaft 117.

With reference now to FIGURE 9 of the drawing, a combined vertical and horizontal multiple nut runner unit 118 is shown. This unit 118 has a wheeled base 120 that is driven by a threaded drive shaft 11 along track 7. On base 120 a high, back frame 121 is mounted with a vertically raisable horizontal table 122 keyed at 123 to same for adjustability to suit height of shape web above transmission rails 8. T keyed at 124 to the upper surface of this table 122 is a vertical U frame 125 for projection outwards towards end of shape 12. Two horizontal platens 126 of FIGURE 9 guided by uprights 127 of said U frame 125 are adjustable to different vertical distances apart to suit gauge dimension of flanges of shape. T keyed at 128 to said platen 126 are two pairs of nut running arms 129 are symmetrically adjustable to different transverse distances apart so as to reach into trough of the shape 12, and to expand over points or shank ends of bolts 27 and run nuts 130 onto same, FIGS. 15 and 16. In connection with this, transmission rail stop 15 at this station will be an adjustable compound stop to, first centre shape for flange bolting and secondly to pull shape back for eccentric locating of succeeding web bolting nearer to forward flange of shape. Motive power 131 of FIG. 14 on ends of nut running arms 132 drive angled nut running sockets 133. Near the front of base 120 are located dual upright guide standards 134 to which a vertically raisable, horizontal table 135 is keyed at 136 for the raising of the nut running mechanism 31 used for the web bolting operation. Pointer 202 determines position of U frame 125 upon table 122 with reference to a scale thereon.

Returning to FIGURE 9, table 122 is vertically adjusted by motor, 137, speed reducer 138, shafts 139, threaded shafts 140, and gears 141. The U frame 125 is projected outward by motor 142, speed reducer 143 and threaded shaft 144 to move nut running arms 129 into trough of shape 12. Platens 126 are converged by motor 145, speed reducer 146, right and left threaded vertical shafts 147, transverse shaft 148 and train of gears 149. Co-operating web feelers 209 on 126 actuate motor 137 for the precise adjustment.

Nut running arms 129 are adjustable to fit over flange bolts 27 to fix angles 25 to the flanges of the shape 12 by motor 150, speed reducer 151, splined shaft 152 with gears 153 sliding on splined shaft 152 gears 154 and right and left threaded shaft 155 through dependent T lugs 155'. Nut running sockets 133, FIG. 9 are driven by electric or air motors 131 at the far end of arms, FIG. 14. The details of same are an art well known to those skilled in the subject and therefore will not be described in detail. The nut running sockets will however be equipped with devices for the precise adjustment of the torque value for bolt tension such as clutches, stalling or releasing mechanism, controlled air pressure in air motors, or the like for desired maximum possible tightening effort.

In FIGURE 10, there is shown the nut running unit for bolting the angle to web of the shape. Table 135 is raised to working level against web of beam by motor 77 and associated gears and shaft 156 dependent lugs 156' and other items. Motor 157, speed reducer 158, splined shaft 159, gears 160 and spindles 161 drive web nut-running sockets 162. Sliding rotatable hooking lever 163 (partly shown) is used to move those torquing socket blocks 164 longitudinally into place that are required for the particular end web connection being used. The blocks 164 both in and out of position are locked in place by pins extending through tabs 165. The tabs are also used for moving torquing blocks. This nut running unit has drum dials 93 for checking the centering of the shape 12.

With torquing units retracted shape is moved into place and is centered for end mechanism 30 by a forward stop 15. Flange connection angles 25, with bolts 27 force fitted through in the angles, are manually placed on flanges with shanks of bolts through holes in flanges. Sprung arms (not shown) depending from upper platen 126 will hold the same in place. Nuts 130 are placed in flange nut runners 133 and arms 129 are forwarded into place and torque nuts 130 are tightened upon the bolts 27 to a predetermined resistance value. The nut-running arms and associated mechanism are withdrawn and the shape 12 is pulled back to rear stop, to line up other holes 29 with web nut runners 31. Similarly a pre-assembled angle and bolt detail 26 is placed on the web of the shape and is held down manually as table 135 with torquing sockets 162 containing nuts 130 is pressed against web and actuated to turn nuts to selected resistance force.

The inspection unit 34 shown in FIGURE 11 consists of a floor mounted base casting 166 with dual, vertical standards 167 T keyed at 168 to the base casting for symmetrical lateral adjustment for various depths of shapes. The standards 167 are moved by motor 169, speed reducer 169', and right and left threaded shaft 170 operating in T groove 171 of casting and upon depending lugs 172 of the standards 167. A motor 173, speed reducer 174, a shaft 175 and flanged drive wheel 37 with opposite unpowered supporting wheel 177 propel shape 12 longitudinally out of station 5 when placed in same for discharge. Coil energized magnets 178 with extended, shaped cores 179 under wheels 37, increase tractive power and hold shape 12 to wheels or rolls 37 on a possibly misaligned, unlevel path. Lugs 180 at wheel level are formed at each side of standards 167 to carry channels 185 for shape transmission purposes. On top of each standard, FIGS. 11 and 13 an independently controlled reversible motor 181, speed reducer 182 and chain sprocket 183 are mounted with lugged, endless, conveyor type chain 33 operating over said gears 183 and splined, sliding drive shaft 208.

A structural shape 12 on dollys 15 is run to the discharge end of transmission rails 8, and the table 45 of dolly 14 is lowered and the shape is slid off into the shallowed sag of chain 33 over discharge drive 57. Dollys 14 are removed and returned to loading station 1. With shape on chains 33, sag is increased and shape is revolved by chain 33 and motors 181 for inspection of all faces, with vertical standards 167 diverged as required. On completion of inspection, the shape is lowered to wheel 37 level, usually with web flat, chain is further sagged, and reversible motors 173 are actuated to propel completed member longitudinally out of machine.

In FIGURE 12, there is illustrated finished member 67 supported on dual, transmission channels 185, carrying similar rollers 37 and coil magnets 178 as hereinbefore described for moving completed assembled shapes 67 away from the machine, with compressed air motor drives 176. Interrupted light beam 200 to 201 actuates coils 178.

In FIG. 15, the details of vertical nut runner block 31 are shown a commercially available adjustable friction, magnetic, spring loaded or similar clutch, or stalling mechanism 186, an art well known to those skilled in the trade is; interposed between drive spindle 161 and driven end of nut running spindle 187. A mating angle 26 is forced into slot 188 of the block 31 and temporarily held by spring detents 189 or by magnetic means as described in my Patent No. 3,085,148 and in my co-pending application #836,793. In hole in top of block 31, a rotatable socket 162 is positioned and is fixed to the upper end of spindles 161 and 187 to receive and turn nut 130 onto end of bolt 27. This socket 162 is equipped with a compression spring 190 that forces adjustable bottom plate 191 up to a limit stop 192 somewhat below top of block 31. Nut is manually placed in recess thus formed. Pre-assembled angle 26 and bolts 27 with fluted or ribbed shank 193 is placed on web of shape with bolt ends protruding through precision drilled holes 29 in web, and is held thus manually or by a simple spring clamp (not shown). The multiple torquing head 31 is raised to web depressing nuts 130 against the action of coil springs 190, and spindles 161 and 187 are rotated turning nuts onto bolts until individually stopped by resistance.

In FIGURE 16, there is shown a somewhat similar horizontal arrangement of the nut runners 133 for bolting angles 25 to flanges of shape 12 with only one far side angle 25 used. Socket bottom plate 194 is a permanent magnet to temporarily retain nut 130. With individual spindles 195 driven by air motors 131 the controlled pressure of air may be used to limit the driving torque or clutch devices similar to those hereinbefore mentioned may be located nearer to the driving power.

In FIGURE 17, there is shown a cross-section of the drilling units 18 of FIGURE 6, shows the upright frame 84 carrying the horizontal web drilling heads 19. In FIGURES 5, 6 and 17, to clarify the mechanisms and actions, the views have been somewhat liberalized leaving out certain details. Fitted closely within the hollow vertical frame 84, is a sliding carrier box 196 adjustable vertically by handwheel 86 and threaded shafts 201', through attached lugs 202' on carrier, gearing and shafts, is set to suit the height of shape flange 197 of FIG. 6, centering the drills 19' on about the centre line of web 198 of shape 12. Dual drill heads 19, carrying a plurality of spindles 92, symmetrically adjustable within, the carrier box by hand wheel 199 and right and left threaded shafts 85 through lugs 200' on drill heads 19, are set to the required gauge distance for the particular size of flange 197 of FIGURE 6. Electric or air motors 203' power drill spindles 92, with cylinders 89 of FIG. 6 feeding individual, selected drills 19' to work faces in the required patterns. Frame 84 is pre-set for size of shape 12 by hand wheel 87 of FIG. 6 held against table mounted, outboard bracket, operating on threaded shaft 204 fixed to outer face of frame. Feeler rod 205 of FIG. 6, is projected from cylinder 206 mounted on side of drill head 18, electrically connected by cable 214 to solenoid 215 shown somewhat below its proper position on feeder rod 205 contacting shape 12. This actuates the solenoid plunger 210 on base portion 213, that engages a racked limit stop 211 on legs of table 212. Locking arrests table in raised position and allows cylinder pressure build-up to hold table in an unyielding position at its proper working height, minimizing vibration. Feeler, compensated for one-half web thickness, centres drill heads 19 on centre line of flange regardless of possible vertical chamber of shape. Changeable, bushed drill frame or fixture is shown at 207, FIG. 6.

The three equal panel bay in multi-story design and construction has become almost a standard of the industry. However, in some industrial applications and about stairs and elevator shafts, beams often are required to be unsymmetrically arranged on girders. To handle this, the locating and resetting power drive 9—10—11, FIG. 1, for inside fabricating units may be modified to move said units independently of each other. With one powered drive shaft moving the outside fabricators symmetrically with respect to middle anchorage, two independent drive shafts by means of gear shifts, levers and controls would move the inside fabricators individually to the different required dimensions from said middle anchorage, when required. For the usual, three equal panel girder, these two latter drives would be matched and locked, to act uniformly together in the speed reducer, gear box 10 by suitable levers, controls and gear shifts, with the inside fabricators equally spaced about a middle anchorage for symmetrical operations.

With the former alternate, multiple details and groups of holes can be applied to a girder on which multiple beams are not formed opposite or symmetrically, by repetitive re-settings and repetitive operations at the same station.

With the threaded lug for movement of unit by powered resetting shaft 11 located eccentrically on base casting of interior fabricators, furthest away from the middle anchorage, one unit can be set, centered over the middle anchorage with dial 93 reading zero, to fabricate two panel symmetrical girders. With repetitive settings, the fabricator can fabricate four panel symmetrical girders. It will be noted that interior fabricators with mechanisms retracted can pass under transmission rails 8 and can be operated outside said rails.

Although the machine fabricator is primarily intended for members of moderate length, where usual location of transmission rails 8 will not interfere with the fabrication of same and for members of unusual length or shortness braced posts 196 with transmission rails 8 may be shifted to supporting base plates closer together at 197 or further apart at 198 as shown only just above station 3 in FIGURE 1. All the other rail support posts may be similarly shifted.

It should be apparent that a novel, practical, specific, and highly integrated, co-acting, machine fabricator has herein been set forth for the complete, finished fabrication in a single pass of a somewhat restricted class of structural steel members ready for field erection. This fabricating machine is flexible, versatile and semi-automatic in operation to enable it to be used as a jobbing fabricator in the preparation of small batches of identical members. However, it will also prove advantageous in the preparation of long runs of such members. Units and controls are arranged for quick-resetting for different sizes and different details of various members.

Designed and arranged for a medium sized shop where conditions warrant, it can be highly mechanized and made automatic in operation as already set forth in my copending applications Serial No. 563,662 and No. 836,793.

For a still more restricted class of members individual stations alone, and in certain cases only certain units of these stations, may be used for the complete or partial fabrication of members as follows:

For girders providing only inside holes for beam support and end flange holes for attachment to seat and cap angles attached to columns, the drilling units at station 2 alone forms a complete fabricator.

For beams requiring only coping of ends and drilling of web at ends the combined top operating coper with underslung drilling units mounted on lower platen as shown in FIGURE 7 can be used as a complete one station fabricator. In this case, length centering levers would be located on backs of coping units with length centering shaft projecting through back wall of machine as shown at 199' of FIGURE 7. This station could, as described above be used in conjunction with the web nut running units 118 only, locating same at the ends of the next station, where web end angles are required. Alternately, as shape came out of the coping-drilling combination set up, angles could be manually bolted or riveted in place.

All of these and other apparent and anticipated variations in the present invention are intended to form a part of the present invention.

While various changes may be made in the detail construction, it shall be understood that such changes shall be within the spirit and scope of the present invention, as defined by the appended claims.

What I claim as new and desire to protect by Letters Patent of the United States is:

1. A fabricating machine for drilling, coping, nut turning and inspecting the structural shapes comprising a plurality of parallel pairs of tracks, drilling, coping and nut turning units respectively successively disposed for movement on the respective pairs of tracks, means associated with each of said tracks and their units for adjusting said units along the tracks, a pair of structural shape transmission rails extending normal to and over the plurality of tracks intermediate the lengths thereof for the transmission of the structural shape in succession to the different work-performing units, said transmission rails extending from a shape receiving station beside the drilling units and extending to and beyond a discharge station lying beyond the nut running units, work carrying dollies operable along said transmission rails and adapted to receive the structural shape and convey the same thereover to the different work performing units, means for arresting the dollies with the structural shape to respective unit work stations, and an inspection and discharge unit disposed at the discharge end of the transmission rails to receive the assembled structural shape from the work-carrying dollies for inspection and discharge from the machine.

2. A fabricating machine for drilling, coping, nut turning and inspecting the structural shapes as defined in claim 1, centering devices associated with the drill units to initially center the structural shape upon the dollies and lock devices on the dollies for securing the structural shape to the dollies upon the structural shape being centered thereon by the centering device.

3. A fabricating machine for drilling, coping, nut turning and inspecting the structural shape as defined in claim 2, and said inspection unit having chain drive means for receiving the structural shape upon being released from the dollies and for turning the structural shapes about its longitudinal axis and a discharge conveyor for discharging the structural shape from either one end or the other of the inspection unit to either accept or reject the assembled structural shape.

References Cited in the file of this patent

UNITED STATES PATENTS

| | | |
|---|---|---|
| Re. 20,068 | Herzberg | Aug. 18, 1936 |
| 1,182,356 | Davis | May 9, 1916 |
| 1,188,626 | Cotsky | June 27, 1916 |
| 1,829,971 | Trevellyan | Nov. 3, 1931 |
| 1,873,547 | McClintic | Aug. 23, 1932 |
| 1,978,879 | Ferris | Oct. 30, 1934 |
| 2,042,463 | Henderson | June 2, 1936 |
| 2,049,263 | Jones | July 28, 1936 |
| 2,208,139 | Senner | July 16, 1940 |
| 2,218,870 | Brodbeck | Oct. 22, 1940 |
| 2,389,463 | Smotzer | Nov. 20, 1945 |
| 2,746,613 | Meyer | May 22, 1956 |

FOREIGN PATENTS

| | | |
|---|---|---|
| 536,033 | France | Apr. 25, 1922 |